(12) United States Patent
Bury

(10) Patent No.: US 7,970,440 B2
(45) Date of Patent: Jun. 28, 2011

(54) MOBILE PHONE HOLDER FOR MECHANICAL VEHICLES

(75) Inventor: Henryk Bury, Mielec (PL)

(73) Assignee: BURY Sp. z o.o., Mielec (PL)

( * ) Notice: Subject to any disclaimer, the term of this patent is extended or adjusted under 35 U.S.C. 154(b) by 563 days.

(21) Appl. No.: 12/192,992

(22) Filed: Aug. 16, 2008

(65) Prior Publication Data
US 2009/0048007 A1 Feb. 19, 2009

(30) Foreign Application Priority Data
Aug. 16, 2007 (EP) ..................... 07460019

(51) Int. Cl.
*H04M 1/00* (2006.01)
*H04K 3/00* (2006.01)
(52) U.S. Cl. .................. 455/569.2; 455/575.9; 379/446; 379/455
(58) Field of Classification Search .... 455/569.1–569.2, 455/575.8–575.9; 379/446, 455
See application file for complete search history.

(56) References Cited

U.S. PATENT DOCUMENTS

| 6,315,255 | B1 * | 11/2001 | Chan et al. ............... 248/221.11 |
| 7,920,905 | B2 * | 4/2011 | Bury .......................... 455/575.1 |
| 2002/0176571 | A1 * | 11/2002 | Louh ............................ 379/455 |
| 2006/0183511 | A1 | 8/2006 | Shen | |

FOREIGN PATENT DOCUMENTS
EP 0899162 A1 3/1999
* cited by examiner

*Primary Examiner* — Lee Nguyen
(74) *Attorney, Agent, or Firm* — Matthias Scholl P.C.; Matthias Scholl

(57) ABSTRACT

A mobile phone holder comprising a base (6), a cover (1) connected to the base and provided with a cavity (2) for inserting a mobile phone, side protrusions (3) with guides to guide the mobile phone, and a locating base (4), the locating base having a slot (25) and plugs (9), and a push-out mechanism (5) for pushing out the mobile phone from the holder, the push-out mechanism located between the base (6) and the cover (1).

17 Claims, 3 Drawing Sheets

MOBILE PHONE HOLDER FOR MECHANICAL VEHICLES

CROSS-REFERENCE TO RELATED APPLICATIONS

This application claims priority to the European Patent Application No. EP07460019 filed Aug. 16, 2007, the contents of which are incorporated herein by reference.

BACKGROUND OF THE INVENTION

1. Field of the Invention

This invention relates to a mobile phone holder for mechanical vehicles, and especially to a mobile phone holder provided with an unlocking mechanism, which pushes out the phone from the holder in an upward direction.

2. Description of the Related Art

German Utility Model No. DE 296 22 275 U1 describes a mobile phone holder, especially for mechanical vehicles, provided with a catch for locking the phone inserted into the holder and with a button-type unlocking mechanism to release the catch. Pressing both buttons of the mechanism does not result in pushing the phone out from the holder but rather in releasing the lock only. One inconvenience of this design is that the holder is suitable only for mobile phones only which have a hole on their rear surface for engaging with the catch.

U.S. Pat. No. 6,185,302 B1 describes a mobile phone holder for mechanical vehicles, provided with flexible side buttons having clamps, which hold the phone on both sides and concurrently lock it by means catches, which slide into the holes on both sides of the phone. The catches are released by pressing two side buttons, which release the lock but do not make the phone move from its "pressed down" position. A major inconvenience of this solution is also that it requires holes to be present on both sides of the phone.

U.S. Pat. No. 6,085,113 describes a mobile phone holder for mechanical vehicles provided with movable side buttons, which press the phone at both of its sides by means of springs. The phone is unlocked by means of a lever mechanism, which draws the buttons aside.

A major inconvenience of most known mobile phone holders used in mechanical vehicles and provided with a cavity, into which the phone is inserted downwards, is the difficulty to remove the phone from the holder. Accordingly, much opportunity for improvement exists in this technological area.

SUMMARY OF THE INVENTION

In one aspect, this invention provides a mobile phone holder for mechanical vehicles having a cavity to accommodate a mobile phone, which allows pushing the phone out and removing it easily by pressing the side buttons.

In one embodiment of the invention provided is a mobile phone holder, especially for a mechanical vehicle, wherein the pushing mechanism comprises a pushing element, which is favorably designed as a plate, at one end of which there is a toothed bar, which engages with the sprocket wheel sections mounted rotatably in a guiding plate in the cover and provided with buttons at one end and with the pins pushing the phone out from the holder on the other end; the said pins located slideably in the holes in the locating base, and the guiding plate provided with the guides and connected detachably with the cover.

In a class of this embodiment, the push-out mechanism is provided with a return spring located between the guiding plate and the pushing element.

In another class of this embodiment, the pins, which push out the phone from the holder are hooks being an integral part of the pushing element.

In another class of this embodiment, the guiding plate of the holder is provided with sleeves, into which the sprocket wheel sections are rotatably mounted and into which the axial pivots of the cover slide, and curved guides used to make the sprocket wheel sections rotate.

In another class of this embodiment, the sprocket wheel sections are provided with curved grooves, into which the corresponding pivots of the cover slide to limit the rotation of these sprocket wheel sections.

In another class of this embodiment, the pushing element is provided with a guiding groove, which also limits the movement of the pushing element and engages with the pivot protruding from the cover.

In another class of this embodiment, the guiding base of the holder is connected with the cover by means of screws in a detachable manner.

BRIEF DESCRIPTION OF THE DRAWINGS

The mobile phone holder for mechanical vehicles, according to the invention, is depicted on the drawings attached, in which.

Figure 1:
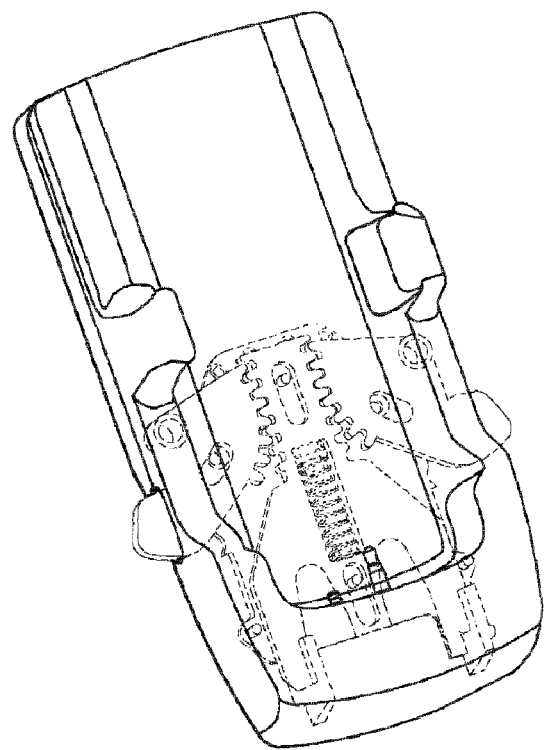
FIG. 1 is a perspective front view of the holder without a mobile phone according to one embodiment of the invention.
Figure 2:
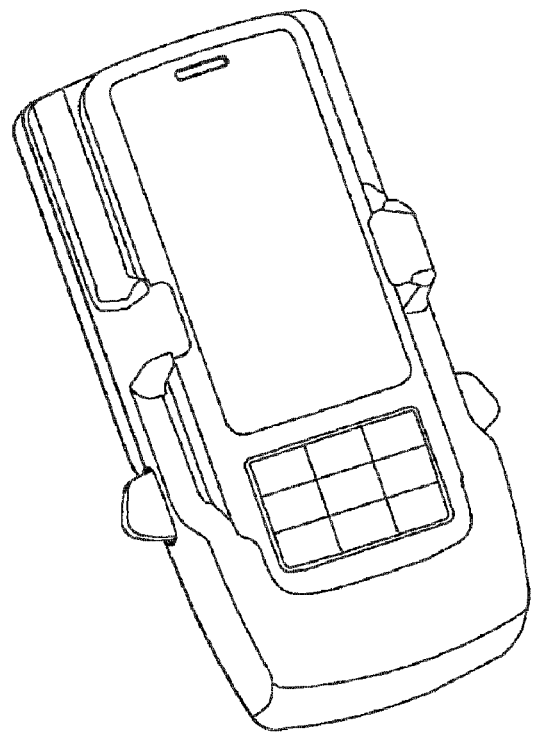
FIG. 2 shows a holder with a mobile phone inserted in the holder according to one embodiment of the invention.
Figure 3:
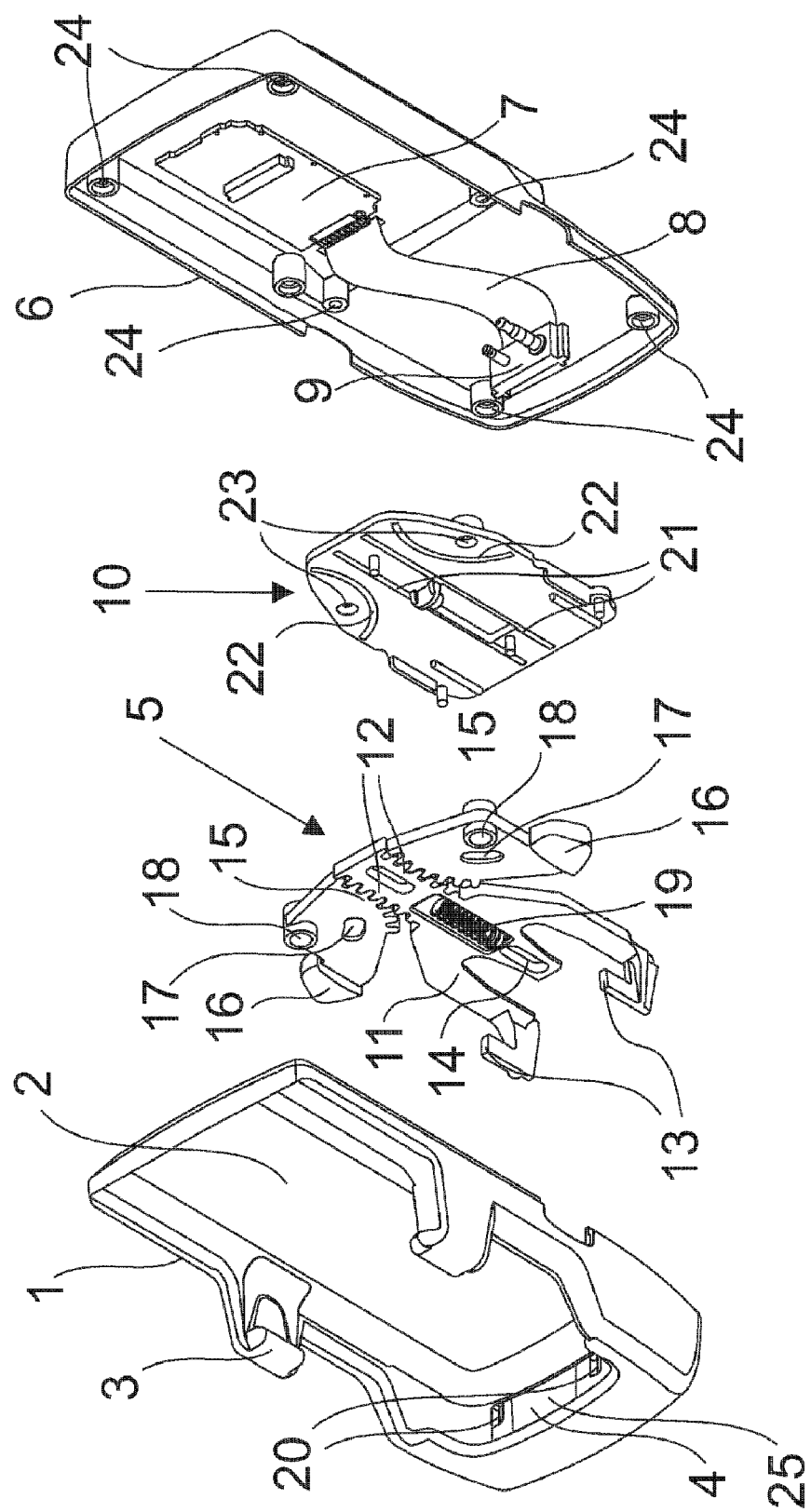
FIG. 3 is an exploded view of the holder and its particular components according to one embodiment of the invention.
Figure 4:
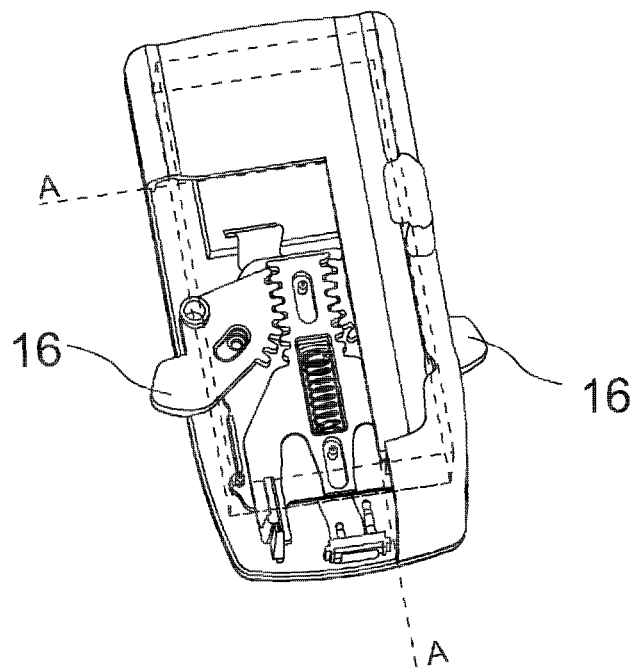
FIG. 4 is a sectional view of the holder with the cover removed at A-A exposing the push-out pins in their non-depressed state, according to one embodiment of the invention.
Figure 5:
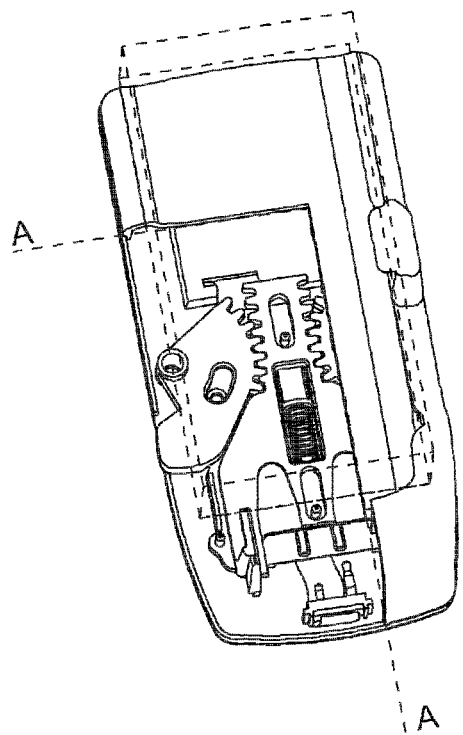
FIG. 5 is a sectional view of the holder with the cover removed at A-A exposing the push-out pins in their depressed state, i.e., when the mobile phone is pushed out upwards, according to one embodiment of the invention.

Legend: 1. cover; 2. cavity; 3. protrusion; 4. locating base; 5. push-out mechanism; 6. base; 7. electronic circuit; 8. flexible ribbon cord; 9. plug; 10. guiding plate; 11. pushing element; 12. two-side toothed bar; 13. push-out pin; 14. guiding groove; 15. sprocket wheel section; 16. button; 17. curved grooves; 18. sleeve; 19. return spring; 20. hole; 21. guide; 22. curved guide; 23. hole; 24. sleeve; and 25. slot.

DETAILED DESCRIPTION OF THE INVENTION

The mobile phone according to the invention comprises three units: a cover 1 provided with a cavity 2, which accommodates a mobile phone, with protrusions 3 having guides that allow an upward and downward movement of the phone, and with a locating base 4; a push-out mechanism 5; and a base 6, which has a shape of a flat open-top box, provided with an electronic circuit 7, connected to the plugs 9 by means of an elastic ribbon cord 8.

The push-out mechanism 5 of the mobile phone holder, according to the invention, comprises the following basic components: a guiding plate 10, connected to the cover 1 by means of screws; a pushing element 11, which is movably mounted to the guiding plate and provided with a two-side toothed bar 12 on its one end and with hooked push-out pins 13 and a guiding groove 14.

The two-side toothed bar 12 of the pushing element 11 engages with the sprocket wheel sections 15, which are rotatably located in the guiding plate 10 and end with buttons 16 protruding outside. The sprocket wheel sections 15 are also provided with curved grooves 17 that limit the movement of these sections. The sprocket wheel sections 15 are mounted rotatably by means of sleeves 18, in the holes of which axial pivots are located, protruding from the cover 1 and not depicted in the drawing.

The push-out pins 13 are mounted movably in the holes 20 of the locating base 4 of the cover 1. Between the guiding plate 10 and the pushing element 11 there is a return spring 19, which holds the pushing element 11 in such a position that the push-out pins 13 are hidden in the holes 20 of the locating base 4. The pushing element 11 is located between the guiding plate 10 and the cover 1 and is guided by the guides 21 protruding from both the guiding plate 10 and the lower surface of the cover 1. The rotational motion of the sprocket wheel sections 15 is exerted by the curved guides 22. The guiding plate 10 is connected to the cover 1 by means of screws, which sit in the holes 23 of the guiding plate 10.

The base 6 is connected to the cover 1 by means of screws located in its sleeves 24. The plugs 9 are mounted in the slot 25 in the locating base 4 of the cover 1 and protrude outside the slot.

The mobile phone holder, according to the invention, is also provided with a cord, not shown on the drawings, which connects it to the vehicle electric system, e.g. a power supply, a hands-free kit or other known devices, to which a mobile phone may be connected.

The mobile phone holder with a push-out mechanism, according to the invention, operates as described below. The mobile phone is inserted into the cavity 2 in the cover 1, and pressed to the locating base 4 of the cover so that the plugs 9 protruding from the locating base enter into the electric connection of the mobile phone. Thanks to an elastic clamp by the side protrusions 3, the phone stays in the cavity 2 ready for operation.

To remove the phone from the cavity 2, both side buttons 16 protruding from the holder shall be depressed, which causes the sprocket wheel sections 15, engaging with the two-side toothed bar 12, to move the pushing element 11 upwards and, consequently, the push-out pins 13 to pull out from the holes 20. In this way, the mobile phone is pushed out upwards, which facilitates its removal from the holder. Concurrently, the plugs 9 pull out from the phone connection and the electric connection is terminated. When the buttons 16 are released, the spring 19 causes the pushing element 11 to move again to a position where the push-out pins are hidden inside the holes 20 in the locating base 4 of the cover 1.

The mobile phone holder for mechanical vehicles, according to the invention, can be mounted in any possible manner to the dashboard or a windshield of the mechanical vehicle.

This invention is not to be limited to the specific embodiments disclosed herein and modifications for various applications and other embodiments are intended to be included within the scope of the appended claims. While this invention has been described in connection with particular examples thereof, the true scope of the invention should not be so limited since other modifications will become apparent to the skilled practitioner upon a study of the drawings, specification, and following claims.

What is claimed is:

1. A mobile phone holder comprising
    a base (6),
    a cover (1) connected to the base and provided with a cavity (2) for inserting a mobile phone, side protrusions (3) with guides to guide the mobile phone, and a locating base (4), said locating base having a slot (25) and plugs (9), and
    a push-out mechanism (5) for pushing out the mobile phone from the holder, said push-out mechanism located between the base (6) and the cover (1);
    wherein
    said push-out mechanism (5) comprises a pushing element (11);
    a toothed bar (12) is disposed at one end of said pushing element (11);
    said toothed bar (12) engages with sprocket wheel sections (15) mounted rotatably in a guiding plate (10) in the cover (1) and provided with buttons (16) at one end and with the pins (13) for pushing the phone out from the holder on the other end;
    said pins (13) are slideably located in holes (20) disposed in the locating base (4), and
    said guiding plate (10) is provided with guides (21) and detachably connected with the cover (1).

2. The holder of claim 1, wherein said pushing element (11) is a plate.

3. The holder of claim 1, wherein said push-out mechanism (5) is provided with a return spring (19) located between said guiding plate (10) and said pushing element (11).

4. The holder of claim 3, wherein said push-out pins (13) are hooks being an integral part of said pushing element (11).

5. The holder of claim 3, wherein said guiding plate (10) is provided with sleeves (18), into which the sprocket wheel sections (15) are rotatably mounted and into which axial pivots of the cover (1) slide, and said guiding plate (10) is provided with curved guides (22) for rotating said sprocket wheel sections (15).

6. The holder of claim 3, wherein said sprocket wheel sections (15) are provided with curved grooves (17), into which the corresponding pivots of the cover (1) slide to limit the rotation of these sprocket wheel sections (15).

7. The holder of claim 3, wherein said pushing element (11) is provided with a guiding groove (14), which also limits the movement of said pushing element and engages with a pivot protruding from said cover (1).

8. The holder of claim 3, wherein said guiding plate (10) is detachably connected to said cover (1) by means of screws.

9. The holder of claim 1, wherein said push-out pins (13) are hooks being an integral part of said pushing element (11).

10. The holder of claim 9, wherein said guiding plate (10) is provided with sleeves (18), into which the sprocket wheel sections (15) are rotatably mounted and into which axial pivots of the cover (1) slide, and said guiding plate (10) is provided with curved guides (22) for rotating said sprocket wheel sections (15).

11. The holder of claim 9, wherein said sprocket wheel sections (15) are provided with curved grooves (17), into which the corresponding pivots of the cover (1) slide to limit the rotation of these sprocket wheel sections (15).

12. The holder of claim 9, wherein said pushing element (11) is provided with a guiding groove (14), which also limits the movement of said pushing element and engages with a pivot protruding from said cover (1).

13. The holder of claim 9, wherein said guiding plate (10) is detachably connected to said cover (1) by means of screws.

14. The holder of claim 1, wherein said guiding plate (10) is provided with sleeves (18), into which the sprocket wheel sections (15) are rotatably mounted and into which axial pivots of the cover (1) slide, and said guiding plate (10) is provided with curved guides (22) for rotating said sprocket wheel sections (15).

15. The holder of claim 1, wherein said sprocket wheel sections (15) are provided with curved grooves (17), into which the corresponding pivots of the cover (1) slide to limit the rotation of these sprocket wheel sections (15).

16. The holder of claim 1, wherein said pushing element (11) is provided with a guiding groove (14), which also limits the movement of said pushing element and engages with a pivot protruding from said cover (1).

17. The holder of claim 1, wherein said guiding plate (10) is detachably connected to said cover (1) by means of screws.

* * * * *